US006720701B2

(12) United States Patent
Terada et al.

(10) Patent No.: US 6,720,701 B2
(45) Date of Patent: Apr. 13, 2004

(54) METHOD OF MANUFACTURING COMMUTATOR, APPARATUS FOR MANUFACTURING COMMUTATOR, AND COMMUTATOR

(75) Inventors: Yuichi Terada, Hamamatsu (JP); Kazunobu Kanno, Toyohashi (JP)

(73) Assignee: Asmo Co., Ltd., Shizuoka-Ken (JP)

( * ) Notice: Subject to any disclaimer, the term of this patent is extended or adjusted under 35 U.S.C. 154(b) by 0 days.

(21) Appl. No.: 10/259,211

(22) Filed: Sep. 26, 2002

(65) Prior Publication Data

US 2003/0094878 A1 May 22, 2003

(30) Foreign Application Priority Data

Sep. 26, 2001 (JP) ....................................... 2001-293063

(51) Int. Cl.[7] .................................................. H02K 1/00

(52) U.S. Cl. ....................... 310/233; 310/232; 310/236; 29/597

(58) Field of Search ................................ 310/233, 232, 310/231, 43; 29/597, 596, 598

(56) References Cited

U.S. PATENT DOCUMENTS 3,140,414 A * 7/1964 Skjodt et al. ............... 310/235
3,492,519 A * 1/1970 Kirkwood et al. .......... 310/235
4,920,633 A * 5/1990 Wojcik ........................ 29/597
5,204,574 A * 4/1993 Kanno et al. ............... 310/233
5,584,115 A * 12/1996 Takahashi .................... 29/597

* cited by examiner

*Primary Examiner*—Thanh Lam
(74) *Attorney, Agent, or Firm*—Fish & Richardson P.C.

(57) ABSTRACT

A method of manufacturing a commutator includes the steps of punching a commutator forming plate out of a plate member having a plurality of projections formed at predetermined intervals in such a way that the projections extend in parallel to one another, forming the commutator forming plate cylindrical and arranging the projections on an inner surface of the cylindrical commutator forming plate, filling an interior of the cylindrical commutator forming plate with a molten resin, segmenting the cylindrical commutator forming plate at predetermined angular distances after curing of the resin to thereby form commutator pieces, and positioning the plate member in a mold. The step of punching the commutator forming plate is carried out using a first punch having a plurality of recesses corresponding to the projections. Formed at those portions of each recess which correspond to both corner portions of each projection narrow portions that become narrower in a depth direction of that recess.

18 Claims, 7 Drawing Sheets

Fig. 8
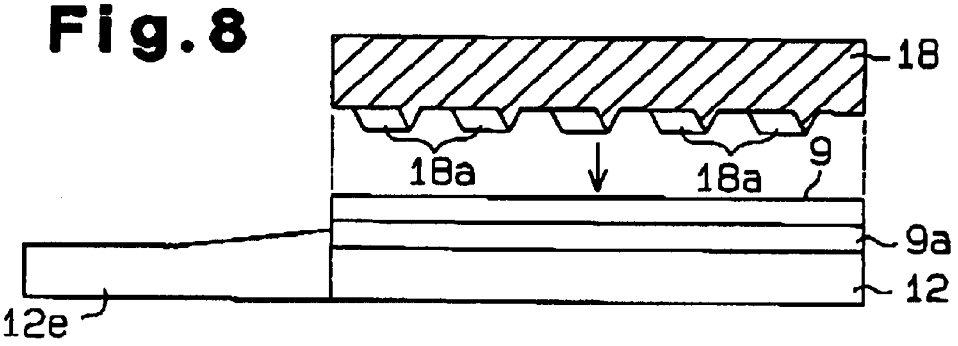
Fig. 9A
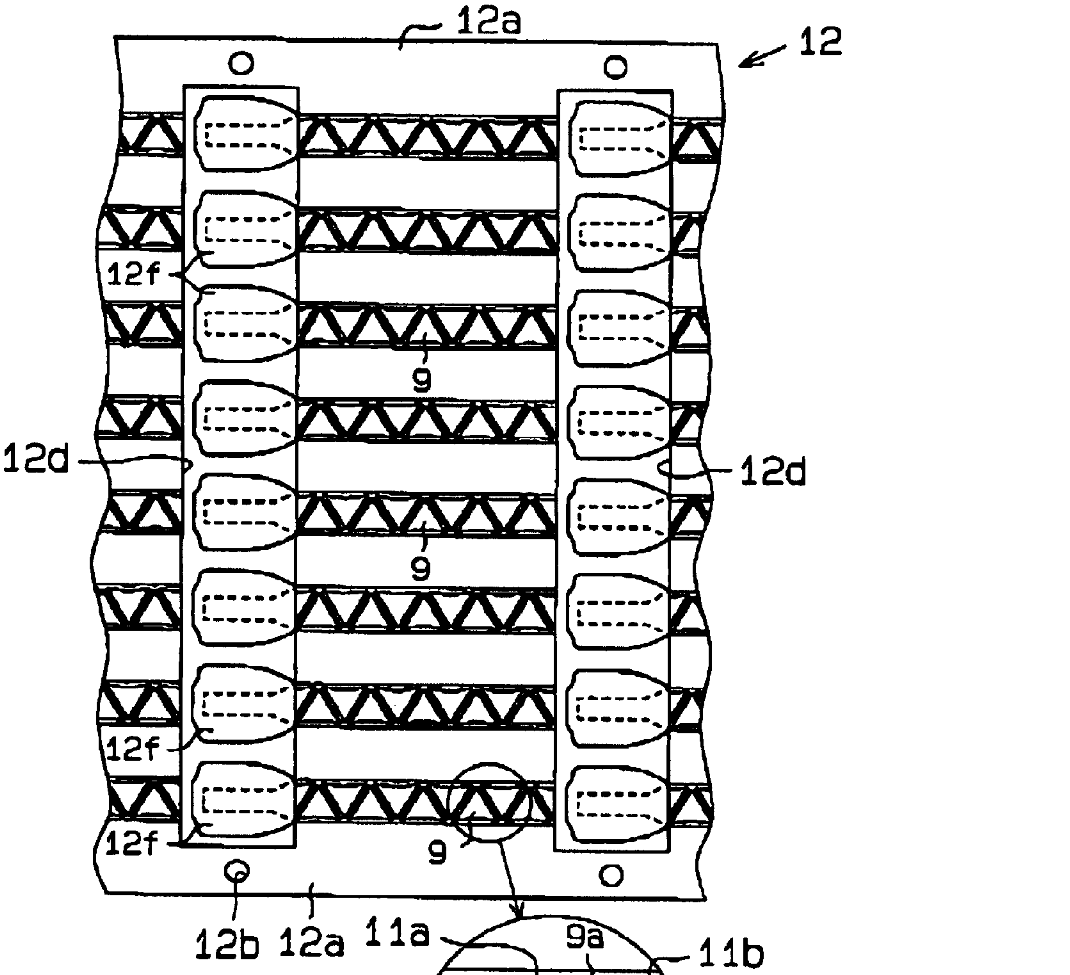
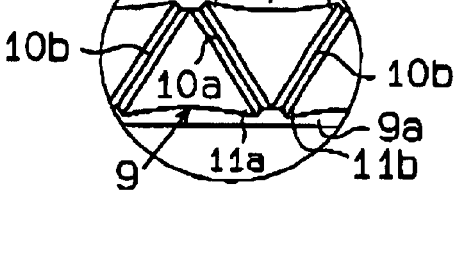
Fig. 9B

METHOD OF MANUFACTURING COMMUTATOR, APPARATUS FOR MANUFACTURING COMMUTATOR, AND COMMUTATOR

CROSS REFERENCE TO RELATED APPLICATIONS

Pursuant to 35 USC §119, this application claims the benefit of Japan Patent Application No. 2001-293063 filed Sep. 26, 2001.

BACKGROUND OF THE INVENTION

The present invention relates to a method of manufacturing a commutator, an apparatus for manufacturing a commutator, and a commutator.

In general, a commutator has an approximately cylindrical insulator made of a resin and commutator pieces provided on the outer surface of the insulator. In a manufacturing method for a commutator, first, a cylinder is formed of a flat plate member and a molten resin is poured into the cavity of the cylinder. After the resin is cured, the cylinder is segmented at equiangular distances. The individual segments of the cylinder become commutator pieces and the cured resin becomes an insulator.

A plurality of projections (which correspond in number to the commutator pieces) extending in parallel to one another are formed, beforehand, at predetermined intervals on the surface of the flat plate member that is used to form the cylinder. Each projection has an extending portion which extends in a direction perpendicular to the lengthwise direction of the projection. When the cylinder is formed of the flat plate member, the individual extending portions are arranged on the inner surface of the cylinder. As each extending portion is engaged with the cured resin, each commutator piece obtained by segmenting the cylinder is prevented from being separated from the insulator.

In case of manufacturing a flat plate member for forming the aforementioned cylinder, as shown in FIG. 13, a plate member 52 which has projections 51, equal in number to commutator pieces, formed at predetermined intervals in such a way as to extend in parallel to one another is prepared first. The length of the plate member 52 in a direction perpendicular to the surface of the sheet of FIG. 13 is a predetermined integer multiple of the axial length of a single commutator in order to form a plurality of commutators (cylinders) from a single plate member 52. Next, a punch 54 is pressed against the plate member 52 placed on a mold 53 and a portion 52*a* of the plate member 52 is punched out of the plate member 52, as shown in FIG. 14. Thereafter, the punched-out portion 52*a* is segmented into plural segments each of which becomes a plate member for forming a commutator (cylinder).

The above-described manufacturing method provides a plate member for forming a plurality of commutators from a single plate member 52. This facilitates, for example, the handling of in the intermediate process (the stage before segmentation of the plate member 52) and management of parts, and can permit processing of a plate member for forming a plurality of commutators at a time. This can lead to reduction in manufacturing cost. Such a commutator manufacturing method is disclosed in, for example, Japanese Unexamined Patent Publication No. 2001-245456.

In the manufacturing method, the shape of the punch 54 is flat (see FIGS. 13 and 14), so that at the time of executing the punching step, the end portions of projections 51 on an end face 52*b* of the plate member 52 are smashed in the widthwise direction of the plate member 52, yielding a plurality of burrs 55 or die wears 56, as shown in FIG. 15. As the burrs 55 enter between the plate member 52 and the mold at the time of processing, punching marks are left on the surface of each commutator piece, resulting in improper contact with the brush or generation of noise. The die wears 56 make the thickness of the plate member 52 uneven. Those would bring about improper working in later processing (e.g., improper formation of the extending portions), resulting in the improper outer shape of the commutator or the separation of the commutator pieces from the insulator.

SUMMARY OF THE INVENTION

Accordingly, it is an object of the invention to provide a method of manufacturing a commutator, an apparatus for manufacturing a commutator, and a commutator, which can suppress the production of burrs or die wearing.

To achieve the object, according to one aspect of the invention, there is provided the following method of manufacturing a commutator. The method includes the steps of punching a commutator forming plate out of a plate member having a plurality of projections formed at predetermined intervals in such a way as to extend in parallel to one another, forming the commutator forming plate cylindrical and arranging the projections on an inner surface of the cylindrical commutator forming plate, filling an interior of the cylindrical commutator forming plate with a molten resin, segmenting the cylindrical commutator forming plate at predetermined angular distances after curing of the resin to thereby form commutator pieces, and positioning the plate member in a mold. The step of punching the commutator forming plate is carried out using a first punch having a plurality of recesses corresponding to the projections. Narrow portions are formed at those portions of each recess which correspond to both corner portions of the corresponding projection in such a way as to become narrower in a depth direction of that recess.

The invention further provides the following apparatus for manufacturing commutator. The apparatus punches a commutator forming plate of a predetermined length out of a plate member having a plurality of projections formed at predetermined intervals in such a way as to extend in parallel to one another by using a first punch. The first punch has a plurality of recesses corresponding to the projections. The commutator forming plate is formed cylindrical in such a way that the projections are arranged on an inner surface of the cylindrical commutator forming plate. The interior of the cylindrical commutator forming plate is filled with a molten resin. The cylindrical commutator forming plate is segmented at predetermined angular distances after curing of the resin to thereby form commutator pieces. The first punch has narrow portions each formed at those portions of each recess which correspond to both corner portions of the corresponding projection in such a way as to become narrower in a depth direction of that recess.

Furthermore, the invention provides the following method of manufacturing a commutator forming plate. The method comprises the steps of preparing a plate member having a plurality of projections formed at predetermined intervals in such a way as to extend in parallel to one another; and punching a commutator forming plate of a predetermined length out of the plate member using a first punch having a plurality of recesses corresponding to the projections and narrow portions each formed at those portions of each recess which correspond to both corner portions of the corresponding projection in such a way as to become narrower in a depth direction of that recess.

Moreover, the invention provides the following apparatus for manufacturing commutator forming plate. The apparatus punches a commutator forming plate out of a plate member having a plurality of projections formed at predetermined intervals in such a way as to extend in parallel to one another by using a first punch. The first punch has a plurality of recesses corresponding to the projections. Narrow portions are formed at those portions of each recess which correspond to both corner portions of the corresponding projection in such a way as to become narrower in a depth direction of that recess.

Further, the invention provides the following commutator forming plate. The commutator forming plate is used to form a commutator. The commutator forming plate has a plurality of projections formed at predetermined intervals in such a way as to extend in parallel to one another. Each projection has an extending portion extending in a direction perpendicular to a lengthwise direction of that projection. A plurality of commutator pieces are acquired by segmenting the commutator forming plate into a plurality of sections along the lengthwise direction of the projections. Each extending portion is secured to an approximately cylindrical insulator to constitute a commutator. The commutator forming plate has cut portions formed by punching the commutator forming plate by using a first punch having a plurality of recesses corresponding to the projections. The first punch has narrow portions each formed at those portions of each recess which correspond to both corner portions of the corresponding projection in such a way as to become narrower in a depth direction of that recess.

Furthermore, the invention provides the following commutator. The commutator comprises an approximately cylindrical insulator, and a plurality of commutator pieces to be secured to an outer surface of the insulator. The individual commutator pieces are acquired by segmenting a plate member having a plurality of projections extending in parallel to one another. Each projection has an extending portion extending in a direction perpendicular to a lengthwise direction of that projection. The commutator pieces have cut portions punched out by a first punch having a plurality of recesses corresponding to the projections. Narrow portions are each formed at those portions of each recess which correspond to both corner portions of each projection in such a way as to become narrower in a depth direction of that recess. The extending portion is engaged with the insulator in a radial direction of the commutator.

Other aspects and advantages of the invention will become apparent from the following description, taken in conjunction with the accompanying drawings that illustrate by way of example the principle of the invention.

BRIEF DESCRIPTION OF THE DRAWINGS

The features of the invention that are believed to be novel are set forth with particularity in the appended claims. The invention, together with objects and advantages thereof, may best be understood by reference to the following description of the presently preferred embodiments together with the accompanying drawings.

FIG. 8 is a diagram for explaining the method of manufacturing the commutator in FIG. 2;

FIG. 9A is a diagram for explaining the method of manufacturing the commutator in FIG. 2;

FIG. 9B is a partly enlarged view of FIG. 9A;

DETAILED DESCRIPTION OF THE PREFERRED EMBODIMENTS

One embodiment of the invention will now be described with reference to FIGS. 1 to 10.

Figure 1:
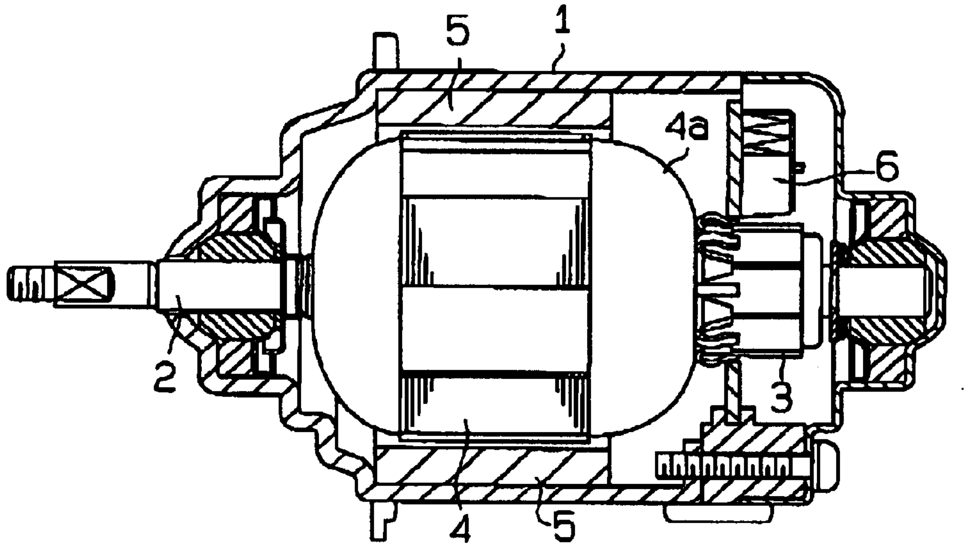
FIG. 1 is a cross-sectional view of the essential portions of a motor according to one embodiment of the invention.

FIG. 1 is a cross-sectional view of the essential portions of a motor. A rotary shaft 2 is rotatably supported in a housing 1 of the motor. A commutator 3 and an armature core 4 around which a winding 4*a* is wound are fixed to the rotary shaft 2. A magnet 5 is fixed to the housing 1 in such a way as to face the armature core 4. A power-feeding brush 6 which is pressed in contact with the commutator 3 is retained in the housing 1.

Figure 2:
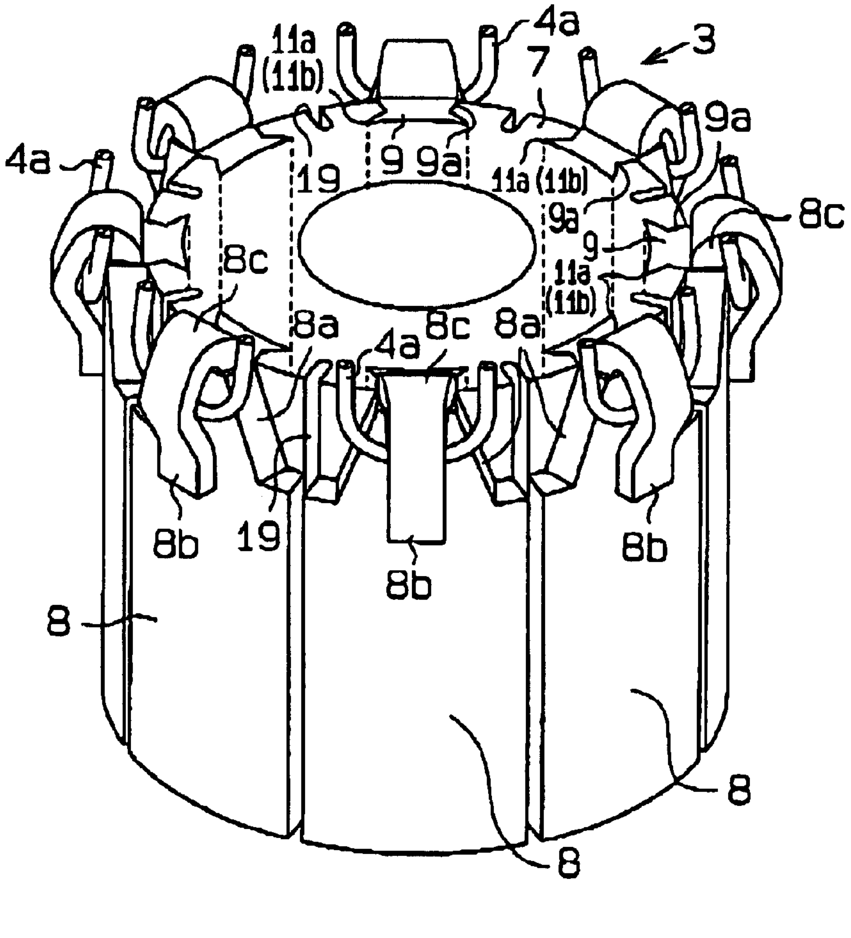
FIG. 2 is a perspective view of a commutator equipped in the motor in FIG. 1.

As shown in FIG. 2, the commutator 3 has an approximately cylindrical insulator 7 made of a resin, and a plurality of commutator pieces 8 to be secured to the outer surface of the insulator 7. In this embodiment, there are eight commutator pieces 8 provided on the outer surface of the insulator 7 at equiangular distances.

Each commutator piece 8 has a shape which is a cylinder cut out by a predetermined angle. Provided on one axial end portion of each commutator piece 8 is a narrow portion 8*a* whose circumferential width becomes narrower toward one end of the commutator piece 8. A projection 9 which is buried in the insulator 7 is formed on the inner surface of each commutator piece 8. A commutator riser 8*b* which is folded over outward in the radial direction of the commutator 3 is coupled to the distal end of each narrow portion 8*a* via a reduced portions 8*c* (see FIG. 10). The cross-sectional area of the reduced portions 8*c* becomes smaller toward the commutator riser 8*b*. Specifically, the reduced portions 8*c* is formed in such a way that its circumferential width becomes narrower, and its thickness becomes thinner, toward the commutator riser 8*b*. As shown in FIG. 2, the winding 4*a* is engaged with each commutator riser 8*b*.

Each projection 9 is positioned in nearly the center of the corresponding commutator piece 8 in the circumferential direction. Each projection 9 extends from one end of the corresponding commutator piece 8 to the other end along the axial direction of the commutator piece 8. With regard to each projection 9 in FIG. 2, the axial direction of the commutator 3 is the lengthwise direction of the projection 9, the circumferential direction of the commutator 3 is the widthwise direction of the projection 9 and the radial direction of the commutator 3 is the height direction of the projection 9.

In the height direction of the projection 9, wide portions 9*a* are formed from the intermediate portion of each projection 9 to the proximal end thereof (see FIG. 4). The width of each wide portion 9*a* becomes wider toward the proximal end of the corresponding projection 9.

FIG. 9A shows a plate member 12 which will be segmented to constitute a plurality of commutator pieces 8. As individual projections 9 formed on the plate member 12 are the same as the projections 9 of the commutator pieces 8 shown in FIG. 2, the projections 9 will now be discussed using FIGS. 9A and 9B. A plurality of first and second grooves 10*a* and 10*b* which are inclined to a line extending in the lengthwise direction of each projection 9 are formed at the top surface of the projection 9.

As shown in FIG. 9B, the adjoining first groove 10*a* and second groove 10*b* are linked. Each groove 10*a*, 10*b* has a V-shaped cross section and extends linearly. Both grooves 10*a* and 10*b* are formed in such a way as to be inclined by a predetermined angle (60 degrees in the embodiment) with respect to the line that extends in the lengthwise direction of the projection 9 in order to segment the projection 9. The first grooves 10*a* and second grooves 10*b* are provided alternately in the lengthwise direction of the projection 9.

As shown in FIGS. 2 and 9B, first and second extending portions 11*a* and 11*b*, which extend in a direction perpendicular to the lengthwise direction of the projection 9, i.e., in the widthwise direction of the projection 9 (vertical direction in FIG. 9), are formed on the projection 9 at the same time as the grooves 10*a* and 10*b* are formed.

The projection 9 is separated into a plurality of triangular portions by both grooves 10*a* and 10*b*. The two acute-angle portions of each triangular portion are easily deformed. Therefore, the two acute-angle portions of each triangular portion respectively constitute the first and second extending portions 11*a* and 11*b* that extend in the widthwise direction of the projection 9.

As shown in FIG. 2, the extending portions 11*a* and 11*b* extend from the intermediate portion of the corresponding projection 9 in the height direction, i.e., from the top portions of the wide portions 9*a* of the projection 9. The extending portions 11*a* and 11*b* are buried, together with the corresponding projection 9, in the insulator 7 and engaged with the insulator 7 in the radial direction. This prevents the commutator piece 8 from being separated from the insulator 7.

Referring to FIGS. 3 to 10, a description will now be given of a method of manufacturing the commutator 3 with the above-described structure and also of the plate member 12 which constitutes a part of the commutator 3 and a method of manufacturing and an apparatus for manufacturing the plate member 12.

Figure 3:
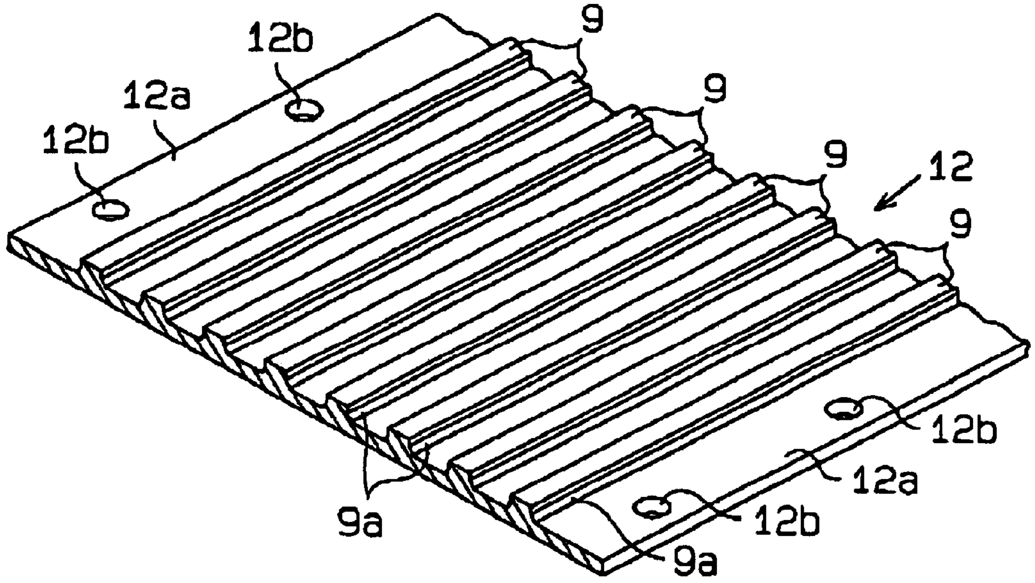
FIG. 3 is a diagram for explaining a method of manufacturing the commutator in FIG. 2.

First, as shown in FIG. 3, the conductive plate member 12 having plural (eight in the embodiment) projections 9 so formed at predetermined intervals on one flat surface as to extend in parallel to one another is prepared. The aforementioned wide portions 9*a* are formed on each projection 9. The length of the plate member 12 in the lengthwise direction of the projection 9 is set to the axial length of the commutator 3 in FIG. 2, specifically, an integer multiple of the length of the commutator piece 8 (see FIG. 10) before the commutator riser 8*b* is bent. The width of the plate member 12 in the direction perpendicular to the lengthwise direction of the projection 9 is set larger than the length of the outer surface of the commutator 3 in FIG. 2 by frame portions 12*a* at both ends of the plate member 12. The interval between adjoining two projections 9 corresponds to the interval between adjoining commutator pieces 8.

Next, a plurality of positioning holes 12*b* (see FIGS. 3, 6 and 9A) which are used to position the plate member 12 to both frame portions 12*a* are formed at predetermined intervals by using an unillustrated punch.

Figure 4B:
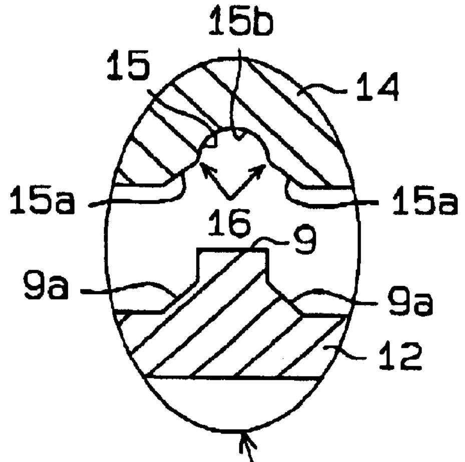
FIG. 4B is a partly enlarged view of FIG. 4A.
Figure 4A:
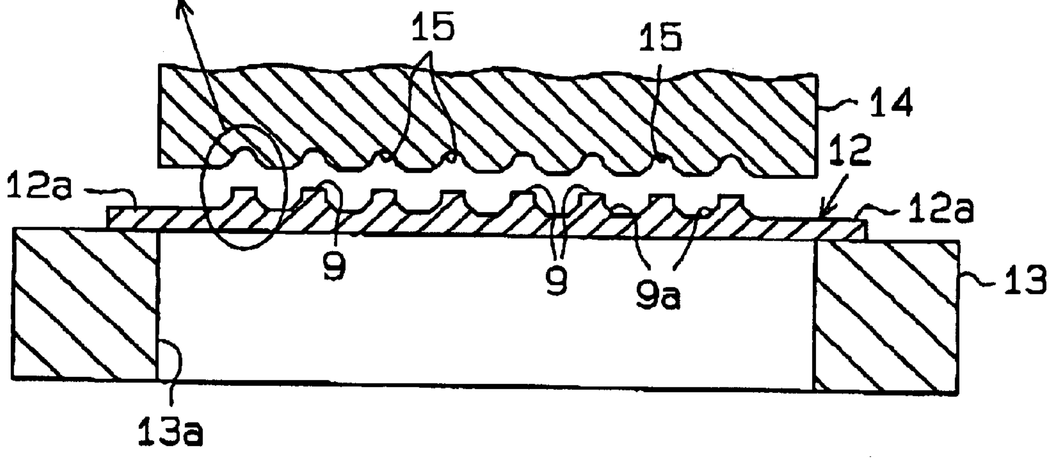
FIG. 4A is a diagram for explaining the method of manufacturing the commutator in FIG. 2.
Figure 5:
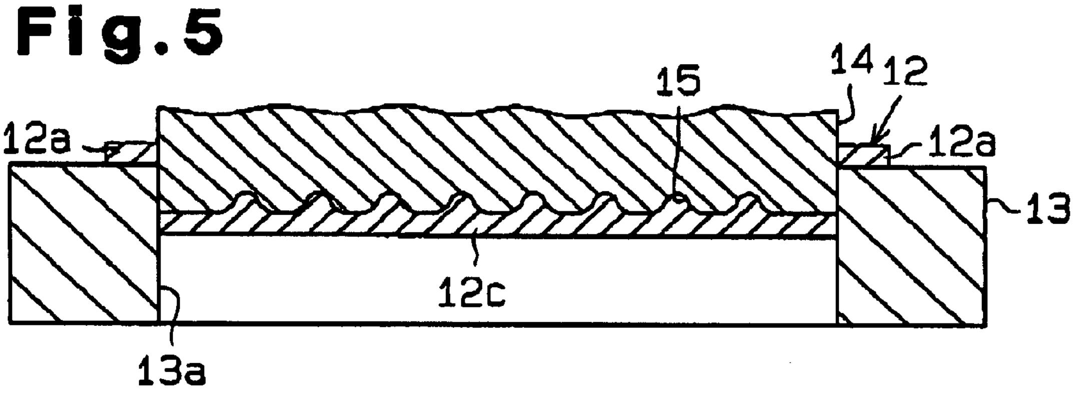
FIG. 5 is a diagram for explaining the method of manufacturing the commutator in FIG. 2.
Figure 6:
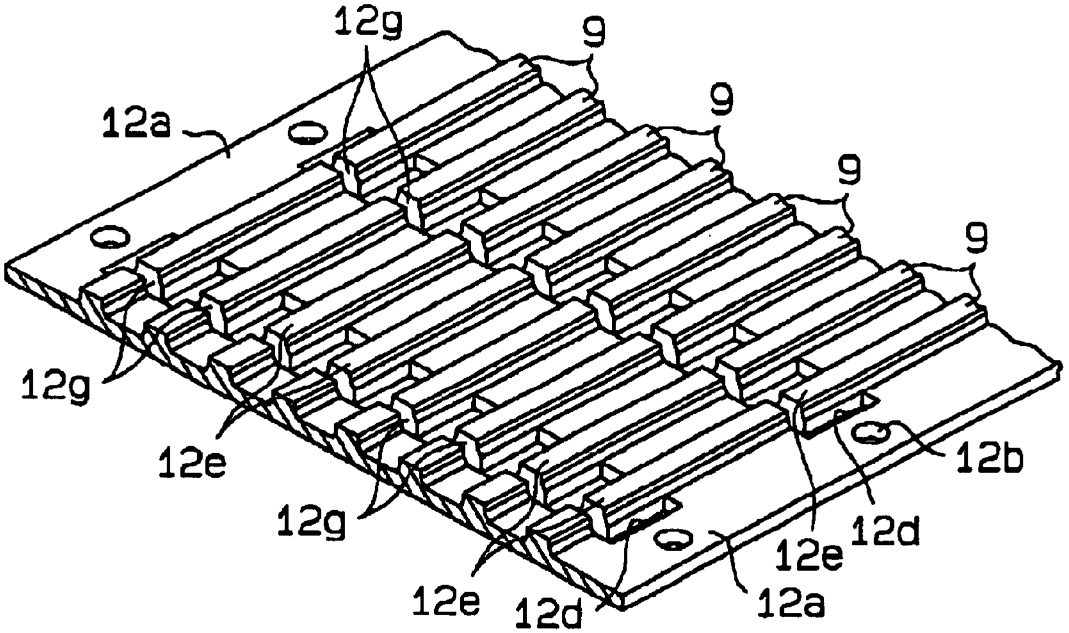
FIG. 6 is a diagram for explaining the method of manufacturing the commutator in FIG. 2.

Then, as shown in FIGS. 4A to 5, a portion 12*c* of the plate member 12 is punched out of the plate member 12 by using a mold 13 and a first punch 14. In the present embodiment, the mold 13 and first punch 14 constitute a part of the commutator manufacturing apparatus. A center hole 13*a* of which the diameter is equivalent to the distance between both frame portions 12*a* is formed in the mold 13. A plurality of recesses 15 are formed in the first punch 14 to correspond to the respective projections 9. As shown in FIG. 4B, narrow portions 16 which become narrower in the depth direction of the recess 15 are formed in those portions of the recess 15 which correspond to both corner portions of each projection 9. Inclined portions 15*a*, which are inclined approximately along the slopes of the wide portions 9*a* of the projection 9, are formed in the opening portion of each recess 15. The bottom portion of each recess 15 has a semicircular portion 15*b* which forms an approximately semicircular shape with its diameter being equivalent to the width of the top portion of the projection 9. The opening portion of the semicircular portion 15*b* is smoothly linked with the inclined portions 15*a* and those portions near the linked portions are equivalent to the narrow portions 16. The plate member 12 is positioned on the mold 13 as shown in FIG. 4A, and the portion 12*c* of the plate member 12 is punched out of the plate member 12 as the first punch 14 is moved downward as shown in FIG. 5. In the embodiment, the first punch 14 has a plurality of unillustrated comb-like teeth portions formed thereon. The individual comb-like teeth portions punch out the portions between the adjoining projections 9 of the plate member 12 to form escape holes 12*d* that form a comb-like teeth shape, and a plurality of riser projections 12*e* for the commutator risers 8*b*, as shown in FIG. 6.

Figure 7:
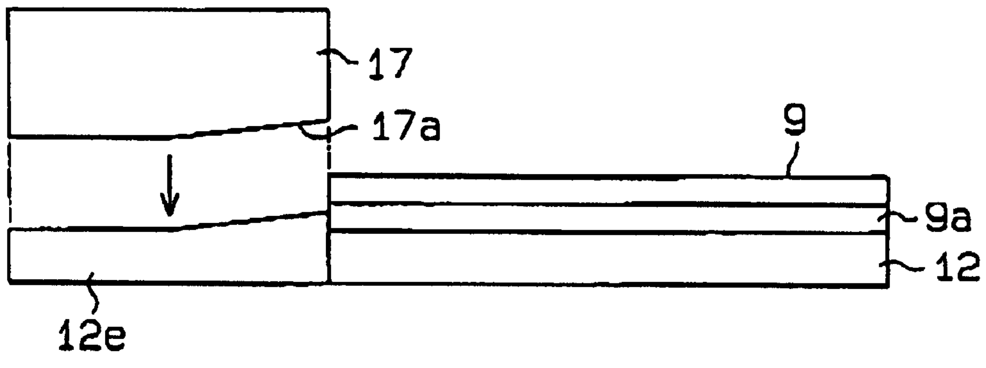
FIG. 7 is a diagram for explaining the method of manufacturing the commutator in FIG. 2.

Next, as shown in FIG. 7, a second punch 17 is moved downward to press the riser projections 12*e* to thereby set the thickness of the riser projections 12*e* to the thickness of the commutator risers 8*b*. The second punch 17 has an inclined portion 17*a* corresponding to the thickness of the reduced portion 8*c* of the commutator riser 8*b*. The inclined portion 17*a* allows the proximal end portion of the riser projection 12*e* to be formed in a thickness corresponding to the thickness of the reduced portion 8*c*. As each riser projection 12*e* is pressed, its extra portion 12*f* escapes into the escape hole 12*d* as shown in FIG. 9A.

Then, as shown in FIG. 8, a third punch 18 is moved downward, the first groove 10*a* and the first extending portion 11*a* are formed. The third punch 18 has a plurality of press projections 18*a*. To form the first groove 10*a* shown in FIG. 9B, each press projection 18*a* is inclined by a predetermined angle (60 degrees in the embodiment) with respect to the side of the projection 9 that extends in the lengthwise direction and becomes narrower toward the distal end. The wide portions 9*a* are formed on each projection 9 and the first extending portion 11*a* extends from the top portion of each wide portion 9*a*. The corresponding second groove 10*b* and second extending portion 11*b* are formed by a similar method by using an unillustrated fourth punch which has press projections inclined in the opposite direction to the press projections 18*a* of the third punch 18.

Figure 10:
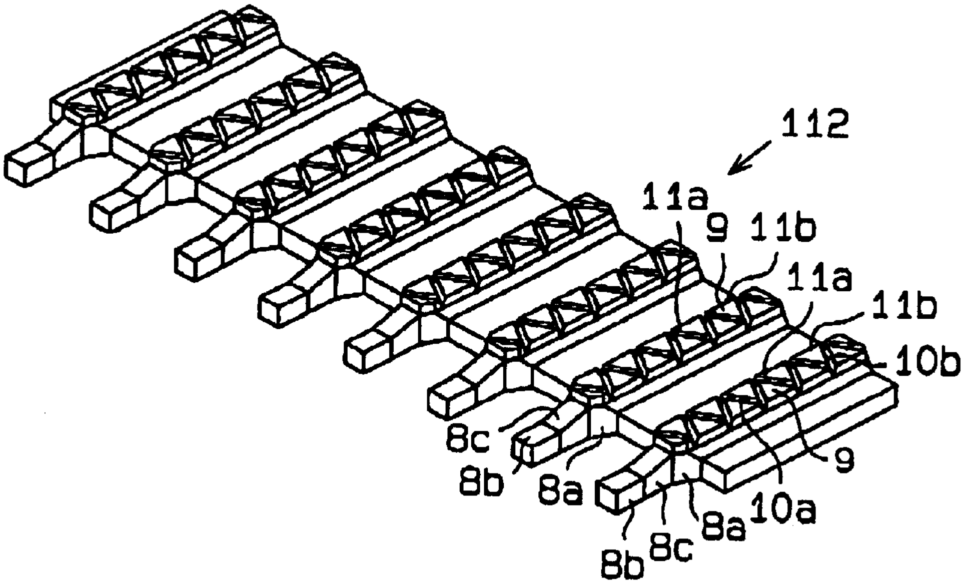
FIG. 10 is a perspective view of a plate member for forming the commutator in FIG. 2.

Next, the both frame portions 12*a* and the extra portions 12*f* of the plate member 12 shown in FIG. 9A are removed after punching. As a result, a plurality of commutator forming plates 112 are acquired from the plate member 12 as shown in FIG. 10. Each commutator forming plate 112 becomes a plate member for forming the commutator 3. Each commutator forming plate 112 has eight projections 9 and commutator risers 8*b* before being bent, which correspond to the projections 9. The width of the commutator forming plate 112, i.e., the length of the commutator forming plate 112 in the direction perpendicular to the lengthwise direction of the projection 9 is equivalent to the circumferential length of the commutator 3.

Next, the commutator forming plate 112 is rolled into a cylinder in such a way that a plurality of projections 9 are arranged inside.

Then, the cylindrical commutator forming plate 112 is placed in an unillustrated mold and the interior of the commutator forming plate 112 is filled with a molten resin as an insulator material. After the resin is cured, the individual commutator risers 8*b* are bend outward in the radial direction of the commutator 3 (see FIG. 2).

Next, the cylindrical commutator forming plate 112 is segmented at equiangular distances into eight segments, thereby forming the commutator pieces 8. Specifically, segmentation grooves 19 are formed from one axial end portion of the commutator 3 to the other end portion by the cutting work in such a way as to penetrate the commutator forming plate 112 from the outer surface thereof and reach the resin. Then, the production of the commutator 3 having eight commutator pieces 8 around the insulator 7 is completed.

The embodiment has the following advantages.

The recesses 15 corresponding to the projections 9 of the plate member 12 are formed in the first punch 14. The narrow portions 16 which become narrower in the depth direction of each recess 15 are formed in those portions of the recess 15 which correspond to both corner portions of each projection 9, as shown in FIG. 4B. At the time of the punching work, therefore, force acting toward the center portion of the projection 9 in the widthwise direction is applied to the corner portions of each projection 9 by the corresponding narrow portions 16, so that the spreading of the projection 9 in the widthwise direction of the projection 9 (the horizontal direction in FIGS. 4A and 5) is suppressed. This restrains the production of burrs and die wearing at cut portions 12*g* of the projections 9 (see FIG. 6). Therefore, entering of burrs between the plate member 12 and the mold at the time of working is reduced, so that punching marks on the surfaces of the commutator pieces 8 can be reduced. This can decrease improper contact with the brush 6 and generation of noise. As the occurrence of die wearing is restrained, the thickness of the plate member 12 becomes even, thus preventing improper working in later processing (e.g., improper formation of the first and second extending portions 11*a* and 11*b*). It is therefore possible to decrease the occurrence of the improper outer shapes of the commutators 3 and the separation of the commutator pieces 8 from the insulator 7.

The semicircular portions 15*b* of the recesses 15 of the first punch 14 suppress the spreading of the projections 9 in the widthwise direction thereof to the end of the punching work. This can further restrain the occurrence of burrs or die wearing of the cut portions 12*g*.

The extending portions 11*a* and 11*b* are formed at the same time as the grooves 10*a* and 10*b* are formed. Because the acute-angle portions of the projections 9 that are separated at the time of forming the grooves 10*a* and 10*b* are easily deformed, the extending portions 11*a* and 11*b* can be formed on each projection 9 by small force. This can allow a compact pressing machine to form the extending portions 11*a* and 11*b* that prevent the commutator pieces 8 from being separated from the insulator 7. The extending portions 11*a* and 11*b* are formed at the same time when the grooves 10*a* and 10*b* are formed in such a way as to beinclined with respect to the lengthwise direction of the projection 9. In case where the grooves 10*a* and 10*b* are formed, for example, in the widthwise center of the projection 9, therefore, it is necessary to position the grooves accurately. In the embodiment, by way of contrast, the positioning of the grooves 10*a* and 10*b* need not be performed at a high accuracy.

The origins of extension of the extending portions 11*a* and 11*b* are the top portions of the wide portions 9*a*. As compared with the case where the origins of extension of the extending portions 11*a* and 11*b* are the proximal end portions of the wide portions 9*a*, therefore, the angle of inclination of the extending portions 11*a* and 11*b* with respect to the direction perpendicular to the line that extends in the radial direction of the commutator 3 becomes smaller. This can make it possible to sufficiently secure the amount of the insulator 7 that is held by the extending portions 11*a* and 11*b*. It is thus possible to further suppress the separation of the commutator pieces 8 from the insulator 7.

The proximal end portion of the commutator riser 8*b* is continuous to the reduced portion 8*c* whose cross-sectional area becomes smaller toward the distal end. While the distal end portion of the commutator riser 8*b* is made thinner, cracking or the like of the bent-over commutator riser 8*b* can be prevented and the strength of the commutator riser 8*b* can be secured.

The embodiment may be modified as follows.

The shape of the recess 15 may be changed as long as the narrow portions 16 are formed in each recess 15 of the first punch 14 shown in FIGS. 4A and 4B at positions corresponding to both corner portions of each projection 9.

Figure 11B:
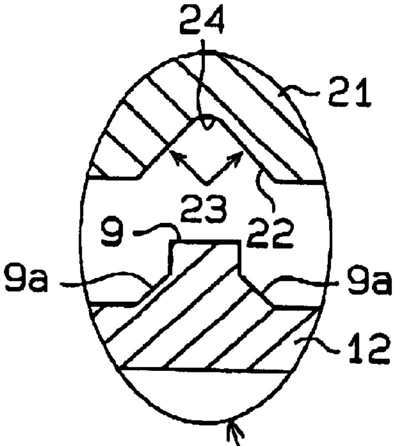
FIG. 11B is a partly enlarged view of FIG. 11A.
Figure 11A:
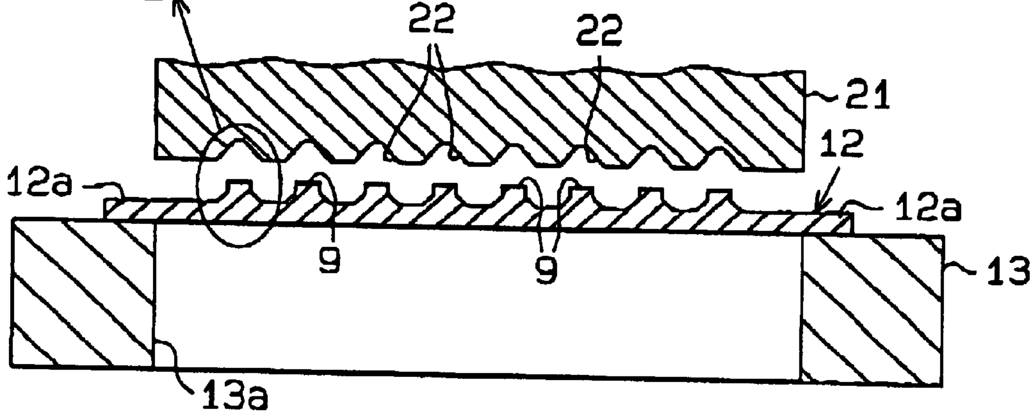
FIG. 11A is a diagram for explaining a method of manufacturing a commutator according to another embodiment.

The first punch 14 shown in FIGS. 4A and 4B may be changed to a fifth punch 21 as shown in FIGS. 11A and 11B. The fifth punch 21 has a plurality of recesses 22 formed therein which correspond to the projections 9. Narrow portions 23 which become narrower in the depth direction of each recess 22 are formed in those portions of the recess 22 which correspond to both corner portions of each projection 9. Each recess 22 has an approximately V shape. The recess 22 has a curved portion 24 which become narrower toward the bottom portion of the recess 22. This modification can provide advantages similar to those of the embodiment illustrated in FIGS. 1 to 10. As the curved portion 24 of each recess 22 gradually becomes narrower to the bottom of the recess 22, spreading of the projection 9 in the direction perpendicular to the lengthwise direction of the projection 9 is suppressed to the end of the punching work. This can further restrain the occurrence of burrs or die wearing of the cut portions 12*g*.

Figure 12B:
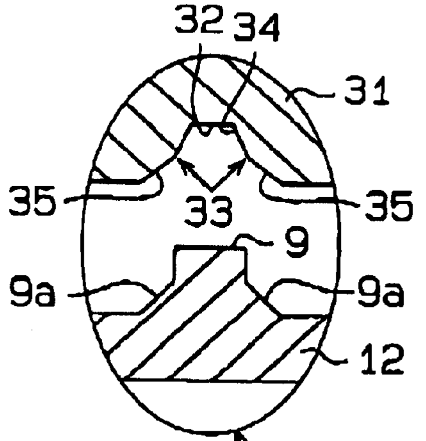
FIG. 12B is a partly enlarged view of FIG. 12A.
Figure 12A:
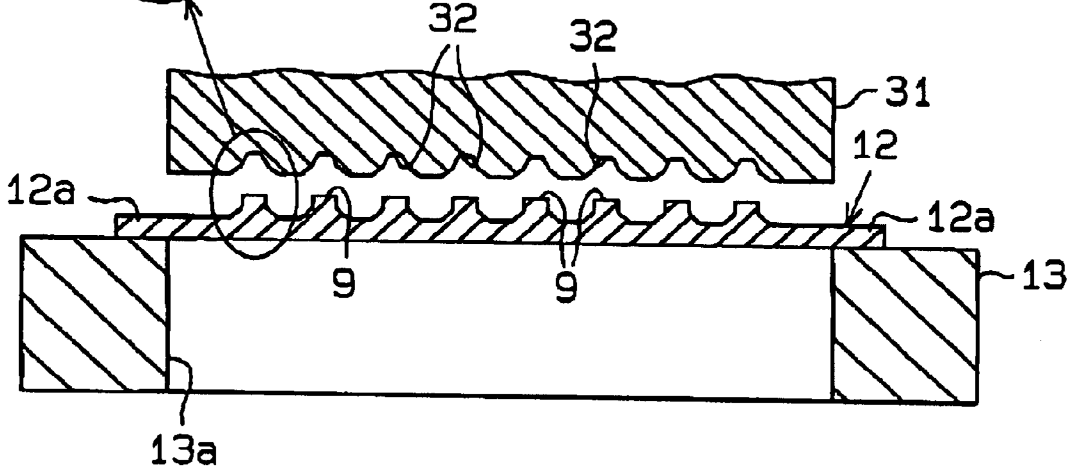
FIG. 12A is a diagram for explaining a method of manufacturing a commutator according to a different embodiment.
Figure 13:
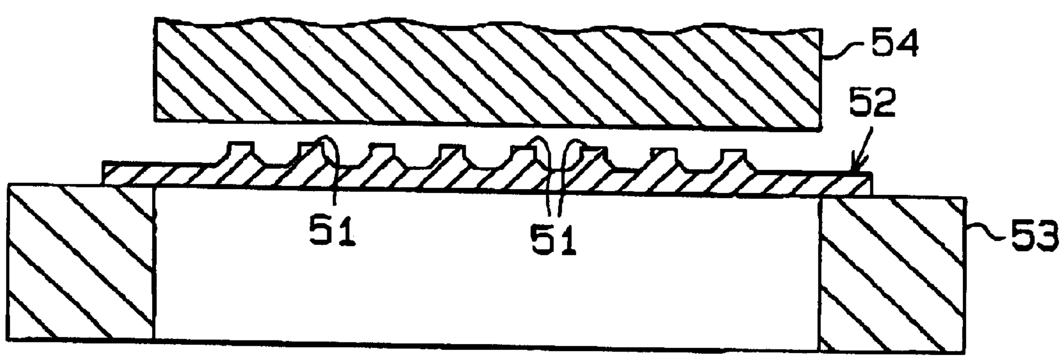
Fig.13 (Prior Art)
FIG. 13 is a diagram for explaining a method of manufacturing a commutator according to prior art.
Figure 14:
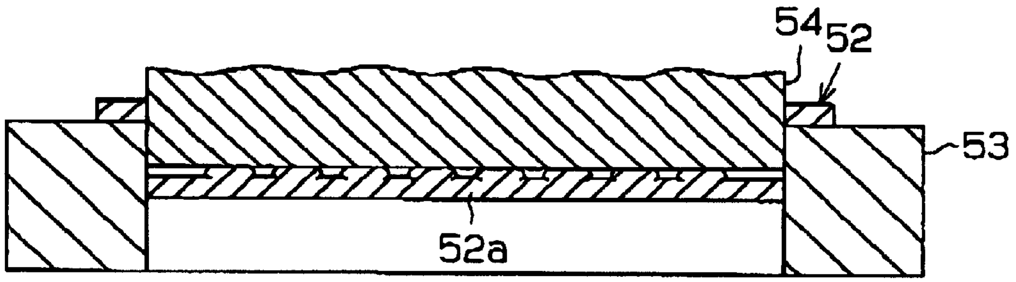
Fig.14 (Prior Art)
FIG. 14 is a diagram for explaining a method of manufacturing a commutator in FIG. 13.
Figure 15:
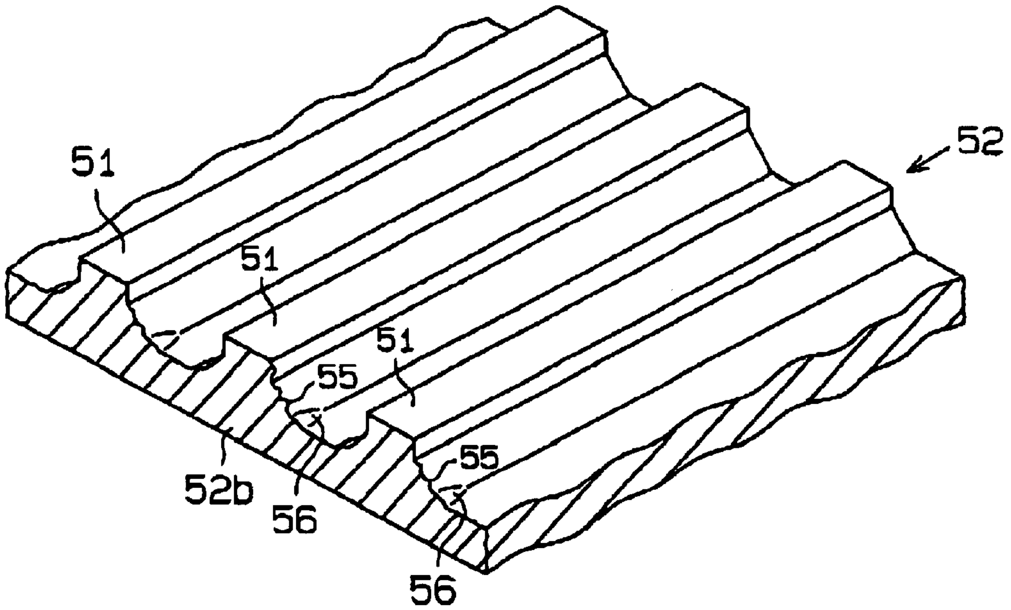
Fig.15 (Prior Art)
FIG. 15 is a perspective view of a plate member for forming the commutator in FIG. 13.

The first punch 14 shown in FIGS. 4A and 4B may be changed to a sixth punch 31 as shown in FIGS. 12A and 12B. The sixth punch 31 has a plurality of recesses 32 formed therein which correspond to the projections 9. Narrow portions 33 which become narrower in the depth direction of each recess 32 are formed in those portions of the recess 32 which correspond to both corner portions of each projection 9. The width of a trapezoidal portion 34 that extends to the bottom of the recess 32 from the narrow portions 33 is smaller than the width of the projection 9 and the width of the narrow portion 33 is approximately equal to the width of the projection 9. Inclined portions 35, which are inclined approximately along the slopes of the wide portions 9*a* of the projection 9, are formed in the opening portion of each recess 32. The opening portion of the trapezoidal portion 34 is smoothly linked with the inclined portions 35 and those portions near the linked portions are equivalent to the narrow portions 33. This modification can also bring about advantages similar to those of the embodiment illustrated in FIGS. 1 to 10. As the trapezoidal portion 34 of each recess 32 gradually becomes narrower to the bottom of the recess 32, spreading of the projection 9 in the direction perpendicular to the lengthwise direction of the projection 9 is suppressed to the end of the punching work. This can further restrain the occurrence of burrs or die wearing of the cut portions 12*g*.

If both extending portions 11*a* and 11*b* can be engaged with the insulator 7 in the radial direction, the extending portions 11*a* and 11*b* may be formed by another method. For example, both extending portions 11*a* and 11*b* may be formed by forming grooves, which extend in the lengthwise direction of each projection 9 and have V-shaped cross sections, in nearly the widthwise center portion of the projection 9.

In the embodiments shown in FIGS. 1 to 12B, the wide portions 9*a* may not be formed on each projection 9.

In the embodiments shown in FIGS. 1 to 12B, the reduced portions 8*c* may not be formed at the proximal end portions of the commutator risers 8*b*.

In the embodiments shown in FIGS. 1 to 12B, the number of the commutator pieces 8 is not limited to eight, but the commutator may be modified to have a different number of commutator pieces provided thereon.

Plural (e.g., two) projections may be formed on a single commutator piece.

What is claimed is:

1. A method of manufacturing a commutator which manufacturing method comprises the steps of:

punching a commutator forming plate out of a plate member, said plate member having a plurality of projections formed at predetermined intervals in such a way that the projections extend in parallel to one another;

forming said commutator forming plate into a cylindrical commutator forming plate while arranging said projections on an inner surface of said cylindrical commutator forming plate;

filling an interior of said cylindrical commutator forming plate with a molten resin;

curing said resin; and segmenting said cylindrical commutator forming plate at predetermined angular distances after curing of said resin to thereby form said commutator pieces;

wherein said method further comprises a step of positioning said plate member in a mold prior to said punching step; and wherein said step of punching said commutator forming plate is carried out using a first punch having a plurality of recesses compounding to said projections and having narrow portions formed at those portions of each recess that correspond to both corner portions of the corresponding projection in such a way that the narrow portions become narrower in a depth direction of that recess.

2. A method of manufacturing a commutator which manufacturing method comprising the steps of:

preparing a plate member having a plurality of projections formed at predetermined intervals in such a way that the projections extend in parallel to one another;

positioning said plate member in a mold;

punching a commutator forming plate of a predetermined length out of said plate member using a first punch having a plurality of recesses corresponding to said projections and having narrow portions formed at those portions of each recess that correspond to both corner portions of each projection in such a way that the narrow portions become narrower in a depth direction of that recess;

forming said commutator forming plate into a cylindrical commutator forming plate while arranging said projections on an inner surface of said commutator forming plate;

filling an interior of said cylindrical commutator forming plate with a molten resin;

curing said resin; and segmenting said cylindrical commutator forming plate at predetermined angular distances after curing of said resin to thereby form said commutator pieces.

3. The manufacturing method according to claim 2, further including a step of moving a second punch to press a predetermined portion of said commutator forming plate to reduce a thickness of said predetermined portion.

4. The method according to claim 2, further including a step of using a third punch having a plurality of press portions to form grooves and extending portions corresponding to said press portion on the associated projections, each press portion being included in a lengthwise direction of the associated projection and each press portion becoming narrower toward a distal end portion of that press portion.

5. The method according to claim 3, further including a step of using a third punch having a plurality of press portions to form grooves and extending portions corresponding to said press portions on the associated projections, each press portion being inclined in a lengthwise direction of the associated projection and each press portion becoming narrower toward a distal end portion of that press portion.

6. An apparatus for manufacturing commutator for punching a commutator forming plate of a predetermined length out of a plate member, said plate member having a plurality of projections formed at predetermined intervals in such a way that the projections extend in parallel to one another, wherein the commutator forming plate produced by said commutator manufacturing apparatus is capable of forming commutator pieces by forming the commutator forming plate into a cylindrical commutator forming plate wherein the projections are arranged on an inner surface of the cylindrical commutator forming plate, filling the interior of said cylindrical commutator forming plate with a molten resin, curing the resin, and segmenting the cylindrical commutator forming plate at predetermined angular distances after curing of said resin, wherein said commutator manufacturing apparatus comprises a first punch that has a plurality of recesses corresponding to said projections wherein said first punch has narrow portions formed at those portions of each recess that correspond to both corner portions of each projection in such a way that the narrow portions become narrower in a depth direction of that recess.

7. A method of manufacturing a commutator forming plate comprising the steps of:

preparing a plate member having a plurality of projections formed at predetermined intervals in such a way that the projections extend in parallel to one another;

positioning said plate member in a mold; and punching a commutator forming plate of a predetermined length out of said plate member on said mold using a first punch having a plurality of recesses corresponding to said projections and having narrow portions formed at those portions of each recess that correspond to both corner portions of each projection in such a way that the narrow portions become narrower in a depth direction of that recess.

8. A method of manufacturing a commutator forming plate comprising the steps of:

preparing a plate member having a plurality of projections formed at predetermined intervals in such a way that the projections extend in parallel to one another; and punching a commutator forming plate of a predetermined length out of said plate member using a first punch having a plurality of recesses corresponding to said projections and having narrow portions formed at those portions of each recess that correspond to both corner portions of each projection in such a way that the narrow portions become narrower in a depth direction of that recess.

9. The method according to claim 8, further including a step of forming, on said projections, extending portions extending in a widthwise direction of said projections and wherein said extending portions can be engaged with an approximately cylindrical insulator within a commutator.

10. The method according to claim 9, wherein said extending portions are formed by a third punch at a same time as grooves inclined in a lengthwise direction of said projections are formed by said third punch.

11. The method according to claim 8, further including a step of forming wide portions, which become wider in a widthwise direction of said projections, wherein said wide portions are formed from intermediate portions of said projections in a height direction thereof toward proximal end portions thereof.

12. The method according to claim 8, wherein bottom portions of said recesses have approximately hemispherical shapes whose diameters are equivalent to the widths of top portions of said projections.

13. The method according to claim 8, wherein each of said recesses has a approximately V-shaped cross section and each recess has a pair of inclined surfaces, which inclined surfaces form said narrow portions, and a curved surface positioned at a bottom of that recess.

14. The method according to claim 8, wherein each of said recesses has a trapezoidal portion whose opening portion has a width approximately equal to the width of said projection and the width of the bottom of said trapezoidal portion is narrower than said width of said projection.

15. An apparatus for manufacturing commutator forming plate for punching a commutator forming plate out of a plate member having a plurality of projections formed at predetermined intervals in such a way that the projections extend in parallel to one another, said apparatus comprising a first punch, said first punch having a plurality of recesses corresponding to said projections, and narrow portions formed at those portions of each recess which correspond to both corner portions of each projection in such a way that the narrow portions become narrower in a depth direction of that recess.

16. The apparatus according to claim 15, wherein bottom portions of said recesses have approximately hemispherical shapes whose diameters are equivalent to the widths of top portions of said projections.

17. The apparatus according to claim 15, wherein each of said recesses has an approximately V-shaped cross section and has a pair of inclined surfaces which inclined surfaces form said narrow portions, and a curved surface positioned at a bottom of that recess.

18. A commutator comprising:

an approximately cylindrical insulator; and a plurality of commutator pieces to be secured to an outer surface of said insulator and acquired by the manufacturing method according to claim 2.

* * * * *